Patented Nov. 23, 1943

2,335,137

UNITED STATES PATENT OFFICE 2,335,137

DIAMINO DIPHENYL METHANES

Viktor Weinmayr, Pitman, N. J., assignor to E. I. du Pont de Nemours & Company, Wilmington, Del., a corporation of Delaware No Drawing. Application July 28, 1939, Serial No. 286,949

7 Claims. (Cl. 260—510)

This invention relates to new compounds, being 4,4'-diamino-diphenyl-methane-poly-sulfonic acids, and to N-alkyl-diamino-diphenyl-methane-poly-sulfonic acids. These compounds are useful in the preparation of azo dyestuffs and as stabilizers for diazotized arylamines.

New compounds which are within the scope of the invention can be made by condensing aniline-disulfonic acids with formaldehyde in the presence of hydrochloric acid. For example, to produce the 2-5, 2'-5'-tetra-sulfonic-acid, aniline-2-5-disulfonic acid is condensed with formaldehyde in the presence of hydrochloric acid yielding 4,4'-diamino-diphenyl-methane-2-5,2'-5'-tetra-sulfonic-acid. Another method of preparing the compounds is by the sulfonation, for example, of 4,4'-diamino-diphenyl-methane with strong sulfuric acid. This reaction produces 4,4'-diamino-diphenyl-methane-3-5,3'-5'-tetra-sulfonic acid as the main reaction product. The presence of other isomers is not harmful. This sulfonation process is mainly useful, for this reason, for the production of the 3,5 isomer.

The constitution of these acids was determined by an oxidative bromination, which replaces all sulfo groups with bromine except those sulfo groups which are in meta position to the amino group, and further brominates the benzene nucleus. Thus metanilic acid and aniline 2,5-disulfonic acid gave a tribromo-aniline-monosulfonic acid when treated with potassium bromate. In a similar manner the diamino-diphenyl-methane-poly-sulfonic acids prepared from aniline 2,5-disulfonic acid and from metanilic acid gave 4,4'-diamino-diphenyl-methane-3-5,3'-5'-tetra-bromo-2,2'-disulfonic acid, showing that one sulfo group was in meta position to the amino group, and that the para position to the amino group was blocked and could thus not be substituted with bromine. The 4,4'-diamino-diphenyl-methane-tetra-sulfonic acid obtained by sulfonation of 4,4'-diamino-diphenyl-methane gave a 4,4'-diamino-diphenyl-methane-2-3-5, 2'-3'-5'-hexabromo-diphenyl-methane, showing that all sulfo groups had been replaced by bromine and had, therefore, been in ortho positions to the amino groups.

The following examples illustrate but do not limit the invention:

EXAMPLE I

*4,4'-diamino-diphenyl-methane-3-5,3'-5'-tetra-sulfonic acid and 4,4'-di(mono-methyl-amino)-diphenyl-methane-tetra-sulfonic acid*

94 parts of 4,4'-diamino-diphenyl-methane are dissolved in 400 parts 100% sulfuric acid, and 135.5 parts of 65% oleum are added below 45° C. in fifteen minutes. The charge is agitated at 20-30° C. for several hours, then the temperature is slowly raised to reach 110° in two hours. Agitation at 100-110° C. is continued for four hours. The charge is cooled, 246 parts of 65% oleum are added, and the temperature is raised to 150° C. over a period of two hours. A reaction temperature of 150-155° C. is maintained for two hours.

The sulfonation mass is then diluted with water to a volume of 8000 cc. and the excess sulfuric acid is precipitated with lime. The calcium salt of the 4,4'-diamino-diphenyl-methane-3-5,3'-5'-tetra-sulfonic acid is converted to the sodium salt with sodium carbonate in the usual manner, and the latter isolated by evaporation to dryness. 275 parts of 4,4'-diamino-diphenyl-methane-3-5,3'-5'-tetra-sulfonic acid sodium salt are obtained, equal to a yield of 85% of theory. It is 93-95% pure by sulfur and nitrogen analysis.

2-3-5,2'-3'-5'-hexa-bromo-4,4'-diamino-diphenyl-methane is obtained when a solution of 10 parts of 4,4'-diamino-diphenyl-methane-3-5,3'-5'-tetra-sulfonic acid sodium salt in 50 parts water, containing 20 parts concentrated hydrochloric acid and 50 parts of a 50% solution of potassium bromide, is treated with 50 parts of a 10% solution of potassium bromate at 25-35° C.

When 4,4'-di-(mono-methyl-amino)-diphenyl-methane is sulfonated under identical conditions, a mixture of 4,4'-di-(mono-methyl-amino)-diphenyl-methane-trisulfonic acid and 4,4'-di-(mono-methyl-amino)-diphenyl-methane-tetra-sulfonic acid is obtained, and heating of the sulfonation mass for a longer time at 150-155° C. or at a slightly higher temperature is necessary to tetra-sulfonate substantially all of the reagent.

EXAMPLE II

*4,4'-diamino-diphenyl-methane-2-5,2'-5'-tetra-sulfonic acid*

866 parts of 73.3% aniline 2,5-disulfonic acid (the impurity being chiefly sodium chloride) are dissolved in 2500 parts of water at 93° C. and 112.5 parts (by vol.) of 40% (vol.) formaldehyde are added at once. If this charge is allowed to cool to room temperature and agitated there for about twenty-four hours, methylene di-(aniline-2-5-disulfonic acid) crystallizes out in long needles. By filtration it may be isolated in at least 60% yield with a purity of better than 90%.

If this isolation is not desired, the charge is heated to 100° C. and agitated at 100° C. for seven hours while introducing a gaseous hydrochloric acid at a moderate rate. The introduction of gaseous hydrochloric acid is continued while the charge is cooled. Practically all of the sodium chloride introduced with the aniline 2-5-disulfonic acid is precipitated, together with some unreacted aniline 2-5-disulfonic acid. The precipitate (306) parts is removed by filtration, and the filtrate is evaporated at 100° under reduced pressure. The residue obtained forms a tarry mass which is digested with 1250 parts of alcohol at 50° C. A crystalline precipitate is formed which is filtered, washed with 500 parts of alcohol and dried at 105° C.

304 parts of 4,4'-diamino-diphenyl-methane-2-5, 2'-5'-tetra-sulfonic acid are obtained, equal to a yield of 41.4% having an average purity of 88% and containing 10% sulfated ash.

4,4'-diamino-3-5,3'-5'-tetra-bromo-diphenyl methane-2,2'-disulfonic acid is obtained from 4,4'-diamino-diphenyl-methane-2-5,2'-5'-tetra-sulfonic acid with potassium bromide and potassium bromate in a manner described in the preceding experiment. The alcoholic filtrate from 4,4'-diamino-diphenyl-methane-2-5,2'-5'-tetra-sulfonic acid is diluted with water, neutralized with sodium hydroxide and evaporated to dryness. 467 parts of impure (about 50%) 4,4'-diamino-diphenyl-methane-2-5,2'-5'-tetra-sulfonic acid are obtained. This product contains inorganic sulfur, indicating that some hydrolysis takes place during the rearrangement of the methylene di-(aniline-2-5-disulfonic acid) with hydrochloric acid. If this latter compound is isolated as described at the beginning of this experiment, the rearrangement may be performed with other mineral acids than hydrochloric acid, and better yields of pure 4,4-diamino-diphenyl-methane-2-5,2'-5'-tetra-sulfonic acid may be obtained.

Example III

*4,4'-diamino-diphenyl-methane-2,2'-disulfonic acid*

623 parts of metanilic acid are suspended in 2600 parts of water and 157 parts (by vol.) of 40% (vol.) formaldehyde are added at 20° C. The reaction mass is heated to 100° C. over a period of ninety minutes during which time the formation of methylene di-(aniline-meta-sulfonic acid) takes place. A clear solution is formed which deposits practically no crystals upon cooling. The reaction mass is heated to 100° C. and saturated with gaseous hydrochloric acid and maintained at 100° C. for sixteen hours. The reaction mass is cooled, filtered from a small amount (7 parts) of regenerated metanilic acid, evaporated to dryness under vacuum and dried at 105° C. 630 parts of 4,4'-diamino-diphenyl-methane-2,2'-disulfonic acid are obtained, equal to a yield of 99.5%. The product is about 95% pure by a sulfur or nitrogen analysis. 100% pure material by nitrogen, sulfur, amino titer analysis is obtained by crystallization from water in which it is very soluble. The product crystallizes in the form of triangular plates, in contrast to the long needles formed by metanilic acid.

4,4'-diamino-diphenyl-methane-3-5,3'-5'-tetra-bromo-2,2'-disulfonic acid is obtained by the usual bromide bromate oxidation.

In the sulfonation of 4,4'-diamino-diphenyl-methane, the amount of monohydrate, which serves essentially as a solvent only may be varied in wide limits or it may be replaced by other solvents used in sulfonations, such as tetrachloro-ethane. The amount and strength of oleum may be varied, a larger excess of SO3 sometimes making sulfonation possible at lower temperatures, and a smaller amount sometimes requiring higher temperatures. 100% SO3 may be introduced into the tetrachloro-ethane solution of 4,4'-diamino-diphenyl-methane. In the preparation of these compounds from aniline sulphonic acids the dilution of the reaction mass and concentration of the mineral acid used may be varied within wide limits. The rearrangement of the

C6H5NHCH2NHC6H5 compound to the diamino-diphenyl-methane derivative is sometimes finished in a shorter time than indicated in the examples and introduction of gaseous hydrochloric acid during the reaction may not be required. It is sometimes advantageous to isolate the initially formed methylene di-anilino-sulfonic acids and to heat them in the presence of anhydrous mineral acids such as monohydrate or anhydrous hydrofluoric acid.

When an amino group is present, the compounds can be diazotized and coupled to ordinary coupling components, such as the arylamides of 2,3-hydroxy-naphthoic acid, to make azo dyes. The compounds are also useful as stabilizers for diazo components.

As many apparently widely different embodiments of this invention may be made without departing from the spirit and scope thereof, it is to be understood that I do not limit myself to the specific embodiments thereof except as defined in the appended claims.

I claim:

1. The bisymmetrical compounds represented by the formula:

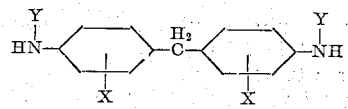

in which each X is at least one sulfonic acid group, and each Y is one of a group consisting of H and alkyl.

2. The compound 4,4'-diamino-diphenyl-methane-3-5,3'-5'-tetra-sulfonic acid.

3. The compound 4,4'-diamino-diphenyl-methane-2-5,2'-5'-tetra-sulfonic acid.

4. The compound 4,4'-diamino-diphenyl-methane-2,2'-disulfonic acid.

5. The process of preparing diamino-diphenyl-methane-disulfonic acids which comprises condensing an aniline-sulfonic acid with formaldehyde in the presence of hydrochloric acid.

6. The bisymmetrical compounds represented by the formula:

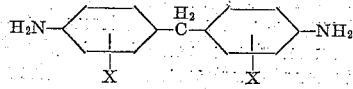

in which each X is at least one sulfonic acid group.

7. The process of preparing bisymmetrical diamino diphenyl methane disulfonic acids which comprises condensing one of a group consisting of the primary and secondary aryl amino sulfonic acids with formaldehyde in the presence of hydrochloric acid.

VIKTOR WEINMAYR.